US012798527B2

(12) United States Patent
Park

(10) Patent No.: US 12,798,527 B2
(45) Date of Patent: Nov. 17, 2026

(54) METHOD AND APPARATUS FOR CONTROLLING A VEHICLE USING A CONDITION OF A DRIVER

(71) Applicants: HYUNDAI MOTOR COMPANY, Seoul (KR); KIA CORPORATION, Seoul (KR)

(72) Inventor: Se Young Park, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 95 days.

(21) Appl. No.: 18/971,252

(22) Filed: Dec. 6, 2024

(65) Prior Publication Data

US 2025/0249872 A1 Aug. 7, 2025

(30) Foreign Application Priority Data

Feb. 5, 2024 (KR) ........................ 10-2024-0017473

(51) Int. Cl.
*B60T 7/12* (2006.01)
*B60W 40/08* (2012.01)
*B60W 50/14* (2020.01)

(52) U.S. Cl.
CPC ............... *B60T 7/12* (2013.01); *B60W 40/08* (2013.01); *B60W 50/14* (2013.01); *B60T 2220/00* (2013.01); *B60W 2040/0818* (2013.01); *B60W 2040/0827* (2013.01); *B60W 2040/0872* (2013.01); *B60W 2050/143* (2013.01); *B60W 2540/221* (2020.02); *B60W 2540/225* (2020.02); *B60W 2540/229* (2020.02)

(58) Field of Classification Search
CPC ............... B60K 28/00–165; B60T 7/12; B60T 2220/00; B60W 30/12; B60W 30/16–17; B60W 30/182; B60W 40/08; B60W 2040/0818; B60W 2040/0827; B60W 2040/0872; B60W 50/082; B60W 50/14; B60W 2050/143; B60W 2540/221; B60W 2540/225; B60W 2540/229; G05D 1/0061; G05D 1/0088; G05D 1/021; G05D 1/0214; G05D 1/0221; G05D 1/0223
See application file for complete search history.

(56) References Cited

U.S. PATENT DOCUMENTS 9,047,780 B2 * 6/2015 Guarnizo Martinez . G08G 1/16
2016/0267335 A1 * 9/2016 Hampiholi ............. G08B 21/06

FOREIGN PATENT DOCUMENTS

CN 107374603 A * 11/2017 ......... A61B 5/02055
CN 118387113 A * 7/2024 ............ B60W 40/00
CN 118717127 A * 10/2024 ............ A61B 3/113
DE 102018211339 B3 * 1/2020 ................ B60T 7/14

OTHER PUBLICATIONS

Eigel, DE 10 2018 211 339, machine translation. (Year: 2020).*

* cited by examiner

*Primary Examiner* — Mark L. Greene
(74) *Attorney, Agent, or Firm* — Lempia Summerfield Katz LLC

(57) ABSTRACT

A method and apparatus for controlling a vehicle using a driver's condition are disclosed. The method for controlling a vehicle includes determining a braking stage based on information on a heart rate range of a driver of the vehicle and information on carelessness of the driver and includes transmitting a control command for braking to the vehicle based on the braking stage.

11 Claims, 7 Drawing Sheets

| HEART RATE RANGE / CARELESSNESS LEVEL | NORMAL RANGE (e.g., 60 to 100 beats per minute) | ABNORMAL RANGE | |
|---|---|---|---|
| | | TACHYCARDIA (e.g., GREATER THAN 100 BEATS PER MINUTE) | BRADYCARDIA (e.g., LESS THAN 60 BEATS PER MINUTE) |
| LEVEL 0 | – | INITIAL STAGE OF TACHYCARDIA: –<br>WHEN TACHYCARDIA IS MAINTAINED:<br>THIRD-STAGE BRAKING + WARNING SOUND | THIRD-STAGE BRAKING + WARNING SOUND |
| LEVEL 1 | FIRST-STAGE BRAKING | INITIAL STAGE OF TACHYCARDIA:<br>FIRST-STAGE BRAKING<br>WHEN TACHYCARDIA IS MAINTAINED:<br>THIRD-STAGE BRAKING + WARNING SOUND | THIRD-STAGE BRAKING + WARNING SOUND |
| LEVEL 2 | SECOND-STAGE BRAKING | INITIAL STAGE OF TACHYCARDIA:<br>SECOND-STAGE BRAKING<br>WHEN TACHYCARDIA IS MAINTAINED:<br>THIRD-STAGE BRAKING + WARNING SOUND | THIRD-STAGE BRAKING + WARNING SOUND |
| LEVEL 3 | SECOND-STAGE BRAKING | WHEN TACHYCARDIA IS MAINTAINED:<br>SECOND-STAGE BRAKING<br>WHEN TACHYCARDIA IS MAINTAINED:<br>THIRD-STAGE BRAKING + WARNING SOUND | INITIAL STAGE OF BRADYCARDIA:<br>SECOND-STAGE BRAKING<br>WHEN BRADYCARDIA IS MAINTAINED:<br>THIRD-STAGE BRAKING + WARNING SOUND |

*FIG. 4*

METHOD AND APPARATUS FOR CONTROLLING A VEHICLE USING A CONDITION OF A DRIVER

CROSS-REFERENCE TO RELATED APPLICATIONS

This application claims priority to and the benefit of Korean Patent Application No. 10-2024-0017473, filed on Feb. 5, 2024, which application is hereby incorporated herein by reference.

TECHNICAL FIELD

The present disclosure relates to a method and apparatus for controlling a vehicle using a driver's condition, and more specifically, to a method and apparatus for controlling a vehicle using a heart rate range and a carelessness level of a driver.

BACKGROUND

The content described below simply provides background information related to the present disclosure and may not constitute prior art.

Autonomous driving technology is a technology for recognizing the environment of a vehicle and the driver's condition even without driver intervention and controlling the vehicle such that the vehicle can travel to its destination on its own using the recognized information.

Autonomous driving technology is at the core of mobility technology, with automobile manufacturers and IT companies actively participating in its development. Accordingly, various technological developments are being carried out to commercialize autonomous vehicles.

In order to implement autonomous driving technology, the development of an advanced driver assistance system (ADAS) has become important. An advanced driver assistance system is a system in which a vehicle controller recognizes a lot of situations that may occur while driving, determines the situations, and controls a vehicle accordingly. Specifically, the advanced driver assistance system includes an active blind spot detection (ABSD) system for detecting the risk of collision within objects in blind spots and assisting in changing lanes safely. The advanced driver assistance system also includes an autonomous emergency braking (AEB) system in which a vehicle automatically reduces the speed or stops when there is the risk of collision with a preceding or lead vehicle even if a driver does not operate a braking device. In addition, the advanced driver assistance system includes a lane keep assist system (LKAS) for adjusting a driving direction to maintain a lane when a vehicle deviates from the lane.

When the functions of advanced driver assistance systems are diversified and subdivided, there is a problem that the occurrence of unnecessary vehicle control increases. Accordingly, in order to prevent unnecessary vehicle control, advanced driver assistance systems need to control vehicles using factors such as a driver's condition.

SUMMARY

An object of the present disclosure is to control a vehicle using a heart rate range and a carelessness level of a driver.

In addition, according to an embodiment, an object of the present disclosure is to brake a vehicle through three methods using a heart rate range and a carelessness level of a driver.

The objects to be achieved by the present disclosure are not limited to the objects mentioned above. Other objects that are not mentioned should be more clearly understood by those having ordinary skill in the art from the description below.

According to an embodiment, a method for controlling a vehicle includes determining a braking stage based on information on a driver heart rate range and information on driver carelessness. The method further includes transmitting a control command for braking to a vehicle based on the braking stage. The information on the heart rate range is obtained by recognizing a heart rate of a driver. The information on carelessness is obtained by recognizing a face of the driver.

According to another embodiment, a vehicle control apparatus includes a memory and a plurality of processors. At least one processor of the plurality of processors is configured to determine a braking stage based on information on a heart rate range and information on carelessness. The at least one processor is also configured to transmit a control command for braking to a vehicle based on the braking stage. The information on the heart rate range is obtained by recognizing a heart rate of a driver. The information on carelessness is obtained by recognizing a face of the driver.

According to yet another embodiment, a computer-readable medium storing a computer program includes computer-executable instructions for causing, when executed by a computer, the computer to perform steps. The steps include determining a braking stage based on information on a heart rate range and information on carelessness and transmitting a control command for braking to a vehicle based on the braking stage. The information on the heart rate range is obtained by recognizing a heart rate of a driver. The information on carelessness is obtained by recognizing a face of the driver. The braking stage is classified into first-stage braking, second-stage braking, and third-stage braking. According to an embodiment of the present disclosure, it is possible to optimally assist a driver in driving a vehicle and prevent accidents by controlling the vehicle based on the heart rate range and carelessness state of the driver.

In addition, according to an embodiment of the present disclosure, it is possible to prevent unnecessary braking of a vehicle by braking the vehicle through three methods using the heart rate range and carelessness state of a driver.

The effects that can be obtained from the present disclosure are not limited to the effects mentioned above. Other effects that are not mentioned herein can be more clearly understood by those having ordinary skill in the art from the description below.

BRIEF DESCRIPTION OF THE DRAWINGS

FIG. 4 is a diagram for describing a braking method according to a heart rate range and a carelessness level of a driver according to an embodiment of the present disclosure.

DETAILED DESCRIPTION

Figure 1:
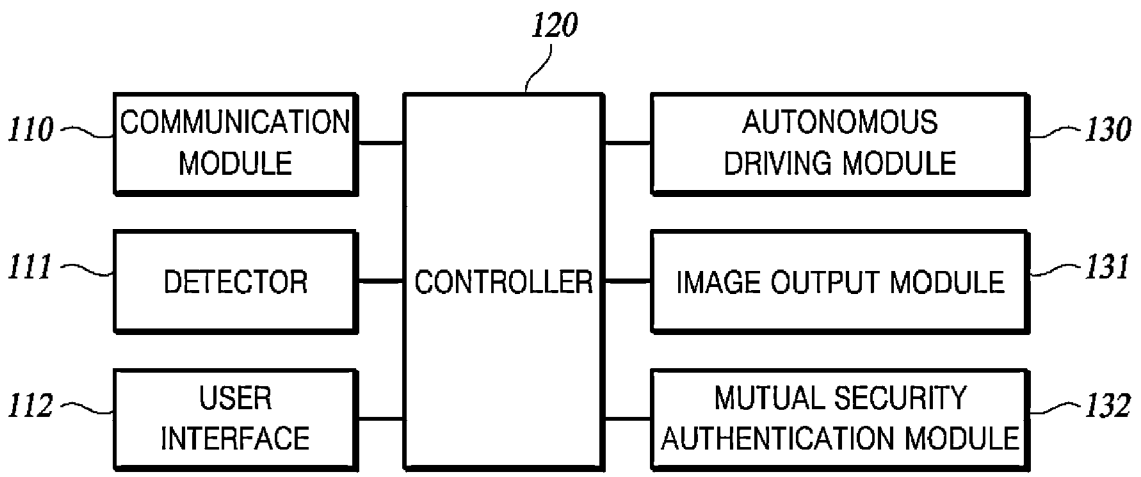
FIG. 1 is a block diagram for describing devices mounted on a vehicle according to an embodiment of the present disclosure.

Hereinafter, some embodiments of the present disclosure are described in detail with reference to the accompanying drawings. In the following description, like reference numerals designate like elements, although the elements are shown in different drawings. Further, in the following description of some embodiments, a detailed description of known functions and configurations incorporated therein has been omitted for the purpose of clarity and for brevity.

Additionally, various terms such as first, second, A, B, (a), (b), and the like, are used solely to differentiate one component from another but not to imply or suggest the substance, order, or sequence of the components. Throughout this specification, when a part 'has', 'includes', or 'comprises' a component, the part is meant to further include other components, not to exclude other components unless specifically stated to the contrary. The terms such as 'unit', 'module', and the like refer to one or more units for processing at least one function or operation, which may be implemented by hardware, software, or a combination thereof. When a component, unit, module, controller, device, element, apparatus, or the like of the present disclosure is described as having a purpose or performing an operation, function, or the like, the component, unit, module, controller, device, element, apparatus, or the like should be considered herein as being "configured to" meet that purpose or to perform that operation or function. Each component, unit, module, controller, device, element, apparatus, and the like may separately embody or be included with a processor and a memory, such as a non-transitory computer readable media, as part of the apparatus.

The following detailed description, together with the accompanying drawings, is intended to describe embodiments of the present disclosure, and is not intended to represent the only embodiments by which the present disclosure may be practiced.

FIG. 1 is a block diagram for describing devices mounted on a vehicle according to an embodiment of the present disclosure.

Referring to FIG. 1, an autonomous vehicle includes a communication module 110, a detector 111, a user interface 112, a controller 120, an autonomous driving module 130, an image output module 131, a mutual security authentication module 132, and the like. The communication module 110 transmits and receives information using a communication network between autonomous vehicles and between autonomous vehicles and other objects. The communication module 110 may transmit and receive information between autonomous vehicles and between autonomous vehicles and other objects using at least one communication method of a wireless LAN, wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), Long Term Evolution (LTE), and LTE-Advanced (LTE-A).

The communication module 110 may perform short range communication between autonomous vehicles and between autonomous vehicles and other objects. Since autonomous vehicles travel while maintaining a short distance from each other, the communication module 110 can transmit and receive information between autonomous vehicles and between autonomous vehicles and other objects using short range wireless communication. The communication module 110 can transmit and receive various types of information between autonomous vehicles and between autonomous vehicles and other objects using Bluetooth, radio frequency identification (RFID), infrared data association (IrDA), ultra wideband (UWB), ZigBee, near field communication (NFC), and Wi-Fi, Wi-Fi Direct, wireless Universal Serial Bus (USB), and the like.

The detector 111 may include a radar, a camera, a wearable device, an electrocardiogram sensor, a lidar, and the like. The detector 111 can detect the speed and position of a neighboring autonomous vehicle and the speed and position of a neighboring object. The detector 111 can detect all objects including obstacles, people, animals, toll booths, breakwaters, and the like, in addition to autonomous vehicles. The detector 111 detects biometric signals of a driver and passengers within a vehicle. Biometric signals may include signals with respect to electrocardiogram, plethymography, electroencephalogram, heart rate, and blood pressure. The detector 111 can detect biometric signals and generate information on the heart rate range of the driver. For example, the information on the heart rate range of the driver may include information on whether the heart rate range of the driver is a tachycardia range, a bradycardia range, or a normal range. The detector 111 may generate the information on the heart rate range of the driver using the age, sex, and body type of the driver.

The detector 111 can detect the driver's face within the vehicle. The detector 111 can generate information on driver's carelessness by detecting the driver's face. The information on the driver's carelessness includes information regarding carelessness level 0, carelessness level 1, carelessness level 2, and carelessness level 3. Carelessness level 0 may correspond to a case in which the driver is concentrating on driving. Carelessness level 1 may correspond to a case in which the driver is talking or in which the driver is careless for a short period of time. Carelessness Level 2 may correspond to a case in which the driver is using a mobile device or the driver is not looking ahead. Carelessness level 3 may correspond to a case in which the driver is drowsy or the driver is not recognized.

The user interface 112 provides a user interface to the driver. The user interface 112 receives information from the driver and transmits the information to the controller 120 or outputs results according to an operation. For example, the driver may input information on a neighboring autonomous vehicle and information on a neighboring object to the user interface 112. The user interface 112 may transmit the information on a neighboring autonomous vehicle and the information on a neighboring object to the controller 120. The controller 120 may issue a control command to the autonomous driving module 130 using the information on a neighboring autonomous vehicle and the information on a neighboring object.

The controller 120 controls the autonomous driving module 130, the image output module 131, and the mutual security authentication module 132 using the information received from the communication module 110, the detector 111, and the user interface 112. The controller 120 may include a trained learning model. The learning model may correspond to a deep learning-based model. The controller 120 may additionally include a learning unit (not shown) to train the learning model in advance. The learning unit can pre-train the learning model using supervised learning, unsupervised learning, semi-supervised learning, and/or reinforcement learning. The specific method by which the learning unit trains the learning model using training data is common in the field, and thus detailed description thereof has been omitted.

The controller 120 may issue a control command to the autonomous driving module 130 using the information on the heart rate range of the driver and the information on the driver's carelessness generated by the detector 111. The controller 120 may not control the autonomous driving module 130 linearly. The controller 120 may divide a braking stage into three stages and issue a control command to the autonomous driving module 130. The controller 120 may be an apparatus (hereinafter referred to as a "vehicle control apparatus") that controls a vehicle using the driver's condition according to the present disclosure.

The autonomous driving module 130 may change or maintain the speed and direction of the vehicle based on a control command from the controller 120. The image output module 131 may output images of neighboring vehicles, neighboring obstacles, neighboring buildings, and the like to the driver based on a control command from the controller 120. The mutual security authentication module 132 may perform authentication using identifiers (IDs) of neighboring vehicles and neighboring objects based on a control command from the controller 120. Autonomous vehicles can perform this authentication to prevent spoofing attacks from attackers.

Figure 2:
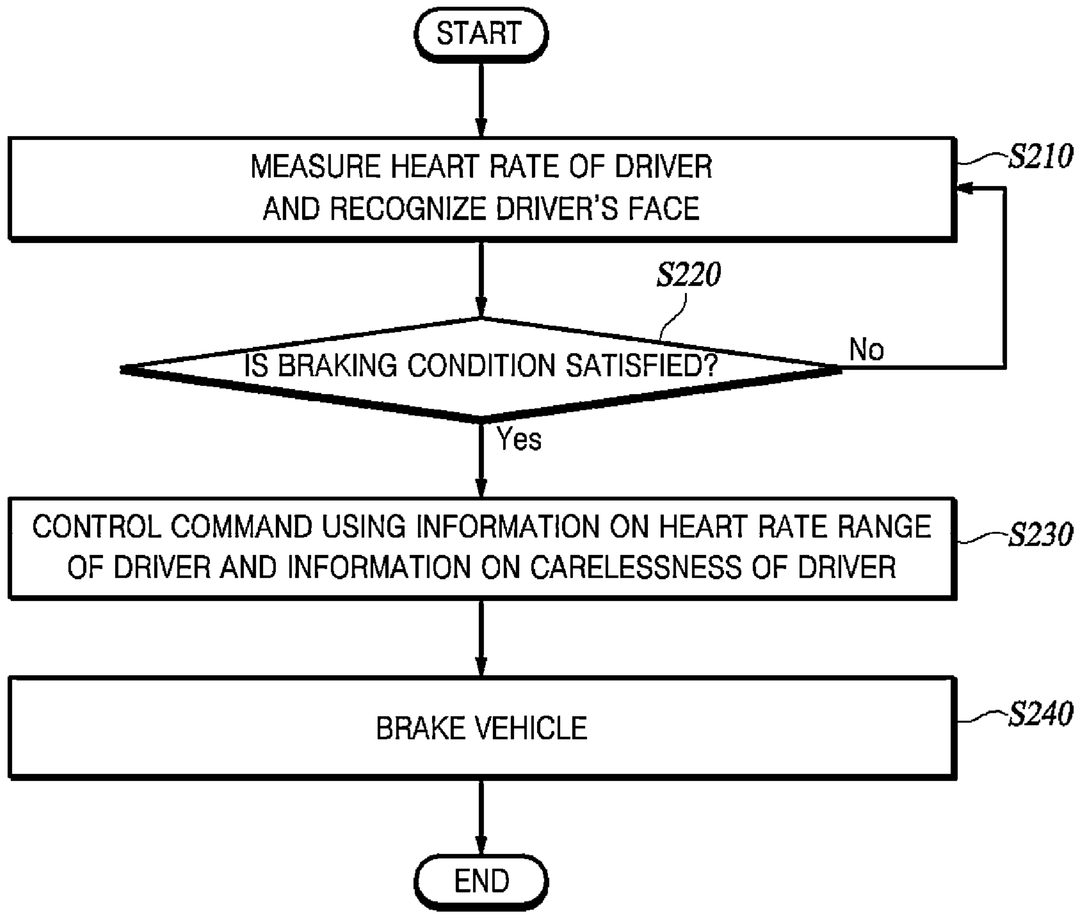
FIG. 2 is a flowchart for describing a process of braking a vehicle using a driver's condition according to an embodiment of the present disclosure.

FIG. 2 is a flowchart for describing a process of braking a vehicle using a driver's condition according to an embodiment of the present disclosure.

Referring to FIG. 2, the detector 111 measures the heart rate of the driver and recognizes the driver's face (S210). The detector 111 can generate information on the heart rate range of the driver and information on the driver's carelessness. The controller 120 determines whether a braking condition is satisfied (S220). The braking condition may correspond to a case in which the heart rate range of the driver is a tachycardia range or bradycardia range and the driver's carelessness level is carelessness level 1, carelessness level 2, or carelessness level 3. If it is determined that the braking condition is not satisfied (S220—NO), the detector 111 measures the heart rate of the driver and recognizes the driver's face (S210).

If it is determined that the braking condition is satisfied (S220—YES), the controller 120 issues a control command to the autonomous driving module 130 using the information on the heart rate range of the driver and the information on the driver's carelessness (S230). The controller 120 can divide braking into three stages and issue a control command to the autonomous driving module 130.

First-stage braking may be braking in which jerk braking is applied to the vehicle once and then a specific deceleration is applied to the vehicle. Jerk braking may be braking for increasing the magnitude of deceleration, maintaining a target magnitude of deceleration for a predetermined time, and reducing the magnitude of deceleration to zero (0). Second-stage braking may be braking in which jerk braking is applied to the vehicle two or more times and then a specific deceleration is applied to the vehicle. The specific deceleration may be any predefined deceleration. Third-stage braking may be braking in which a stepwise deceleration is applied to the vehicle or jerk braking is additionally applied to the vehicle in each deceleration maintenance interval in the stepwise deceleration. The autonomous driving module 130 brakes the vehicle based on a control command from the controller 120 (S240). Thereafter, the vehicle can stop or park on a shoulder or the like.

Figure 3A:
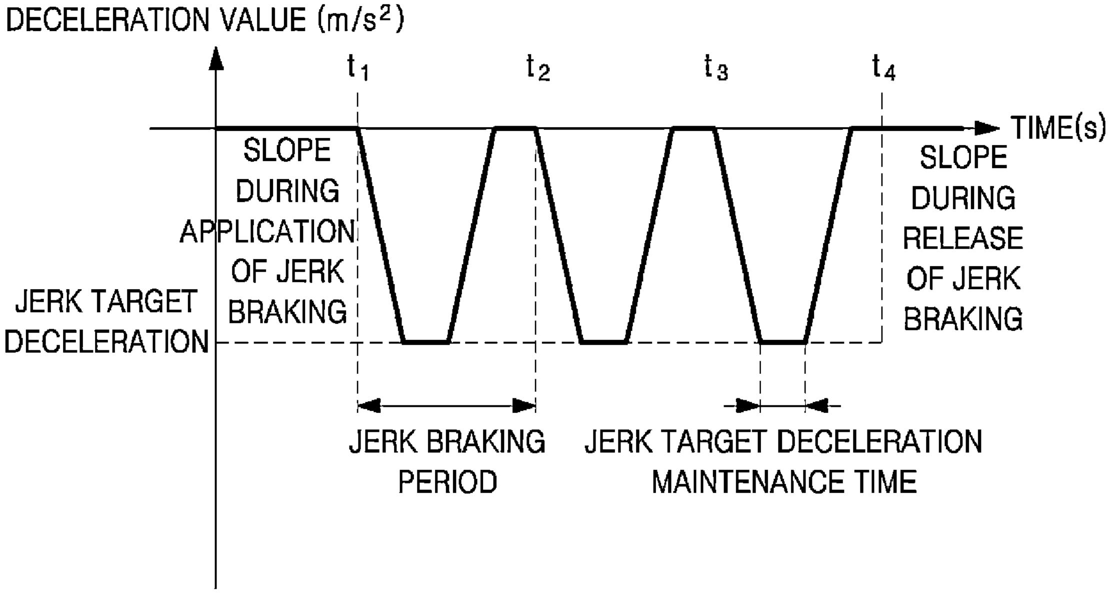
FIGS. 3A, 3B, and 3C are diagrams for describing deceleration over time when braking a vehicle according to an embodiment of the present disclosure.
Figure 3B:
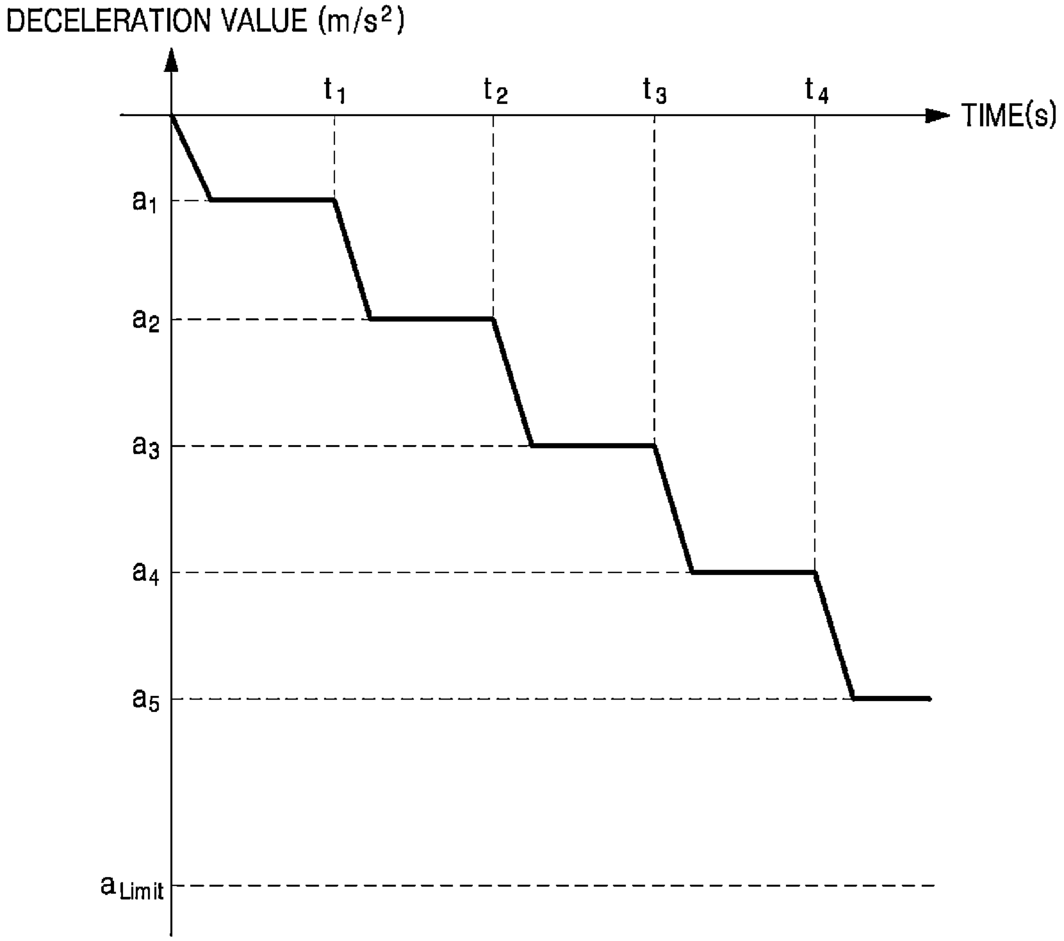
Figure 3C:
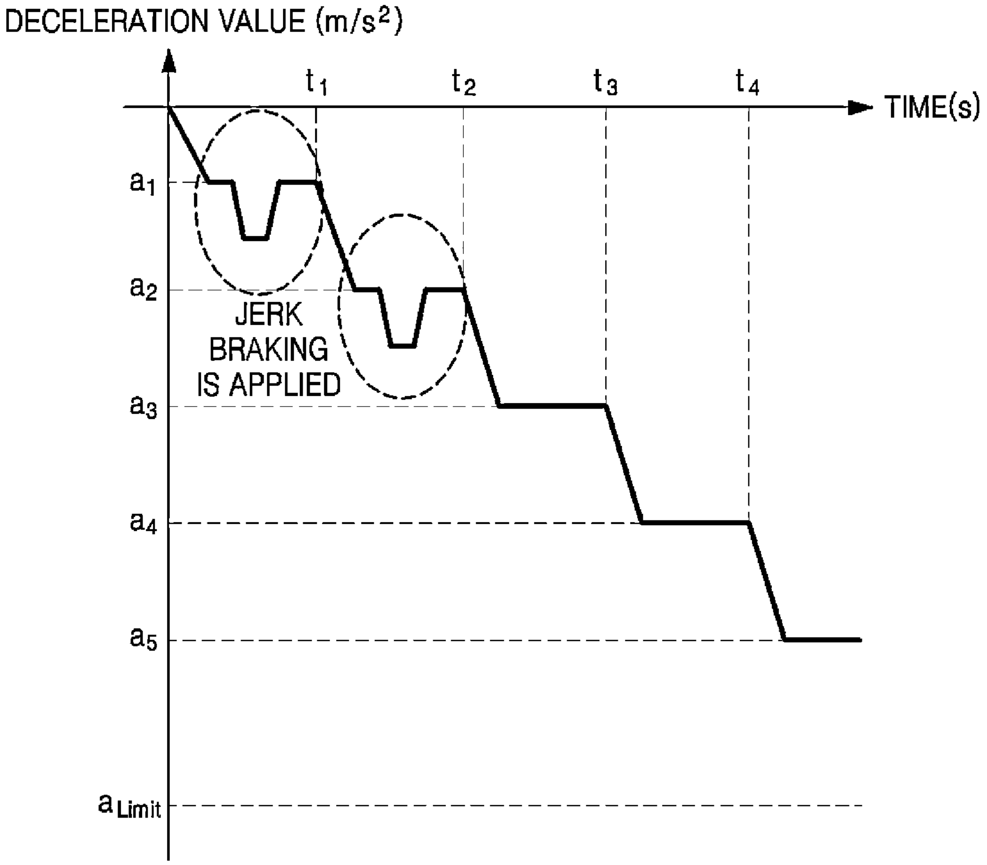

FIGS. 3A, 3B, and 3C are diagrams for describing deceleration over time when braking a vehicle according to an embodiment of the present disclosure.

Referring to FIG. 3A, the controller 120 may issue a control command to the autonomous driving module 130 to perform second-stage braking. Second-stage braking may be braking in which jerk braking is applied to the vehicle three times and then a deceleration of 0 is applied to the vehicle. The autonomous driving module 130 may apply the first jerk braking to the vehicle at time $t_1$. The time $t_1$ may be the start time of jerk braking. By applying jerk braking, the deceleration value of the vehicle can reach a jerk target deceleration value. The deceleration value of the vehicle can be maintained at the jerk target deceleration value for a jerk target deceleration maintenance time. The jerk target deceleration value may be any predefined value. The jerk target deceleration maintenance time may be any predefined time. Thereafter, the magnitude of deceleration of the vehicle may decrease to zero. The first jerk braking may end at time $t_2$. The time from time $t_1$ to time $t_2$ may be the period of the first jerk braking. The period of jerk braking may be any predefined time.

The autonomous driving module 130 may apply second jerk braking to the vehicle at time $t_2$. The second jerk braking may end at time $t_3$. The time from time $t_2$ to time $t_3$ may be the second jerk braking period. The autonomous driving module 130 may apply third jerk braking to the vehicle at time $t_3$. The third jerk braking may end at time $t_4$. The time from time $t_3$ to time $t_4$ may be the third jerk braking period.

The slope during application of jerk braking may be an increase in the magnitude of deceleration of the vehicle from the time at which jerk braking is applied to the time when the deceleration value of the vehicle reaches the jerk target deceleration value. The slope during application of jerk braking may be an indicator indicating how rapidly the magnitude of deceleration increases. The slope during release of jerk braking may be a decrease in the amount of deceleration of the vehicle from the time when the magnitude of deceleration of the vehicle begins to decrease to the time when the deceleration value of the vehicle reaches zero (0). The slope during release of jerk braking may be an indicator indicating how rapidly the magnitude of deceleration decreases.

Referring to FIG. 3B, the controller 120 may issue a control command to the autonomous driving module 130 to perform third-stage braking. The third-stage braking may be braking for applying a stepwise deceleration to the vehicle. The autonomous driving module 130 may apply a first deceleration to the vehicle at time 0 s. By applying the first deceleration, the deceleration value of the vehicle can reach $a_1$. The deceleration value of the vehicle can remain at $a_1$ until time $t_1$ after reaching $a_1$. The autonomous driving module 130 may apply a second deceleration to the vehicle at time $t_1$. The deceleration value of the vehicle can remain at $a_2$ until time $t_2$ after reaching $a_2$. The autonomous driving module 130 may apply a third deceleration to the vehicle at time $t_2$. The deceleration value of the vehicle can remain at $a_3$ until time $t_3$ after reaching $a_3$.

The autonomous driving module 130 may apply a fourth deceleration to the vehicle at time $t_3$. The deceleration value of the vehicle can remain at $a_4$ until time $t_4$ after reaching $a_4$. The autonomous driving module 130 may apply a fifth deceleration to the vehicle at time $t_4$. The deceleration value of the vehicle can reach $a_5$. However, the magnitude of deceleration of the vehicle may not be greater than $a_{Limit}$ due to stepwise deceleration. The deceleration values of the vehicle $a_1$, $a_2$, $a_3$, $a_4$, $a_5$, and $a_{Limit}$ may any predefined deceleration values. Each of time $t_1$, time $t_2$, time $t_3$, and time $t_4$ may any predefined time.

Referring to FIG. 3C, the controller 120 may issue a control command to the autonomous driving module 130 to perform third-stage braking. The third-stage braking may be braking for applying a stepwise deceleration to the vehicle, and at the same time, additionally applying jerk braking to the vehicle in some deceleration maintenance intervals. The autonomous driving module 130 may apply the first deceleration to the vehicle at 0 s. By applying the first deceleration, the deceleration value of the vehicle can reach $a_1$. After the deceleration value of the vehicle reaches $a_1$, the autonomous driving module 130 may apply the first jerk braking to the vehicle. The deceleration value of the vehicle may remain at a first jerk target deceleration value for a predetermined period of time after reaching the first jerk target deceleration value. Thereafter, the deceleration value of the vehicle can reach $a_1$ again. The first jerk target deceleration value may be any predefined value.

The autonomous driving module 130 may apply the second deceleration to the vehicle at time $t_1$. The deceleration value of the vehicle can reach $a_2$. After the deceleration value of the vehicle reaches $a_2$, the autonomous driving module 130 may apply the second jerk braking to the vehicle. The deceleration value of the vehicle may remain at a second jerk target deceleration value for a predetermined period of time after reaching the second jerk target deceleration value. Thereafter, the deceleration value of the vehicle can reach $a_2$ again. The second jerk target deceleration value may be any predefined value. The autonomous driving module 130 may apply the third deceleration to the vehicle at time $t_2$. The deceleration value of the vehicle can reach $a_3$. The deceleration value of the vehicle can remain at $a_3$ until time $t_3$ after reaching $a_3$. The autonomous driving module 130 may apply the fourth deceleration rate to the vehicle at time $t_3$. The deceleration value of the vehicle can remain at $a_4$ until time $t_4$ after reaching $a_3$.

The autonomous driving module 130 may apply the fifth deceleration to the vehicle at time $t_4$. The deceleration value of the vehicle can reach as. However, the magnitude of deceleration of the vehicle may not be greater than $a_{Limit}$ due to the stepwise deceleration. The deceleration values of the vehicle $a_1$, $a_2$, $a_3$, $a_4$, $a_5$, and $a_{Limit}$ may be any predefined deceleration values. Each of time $t_1$, time $t_2$, time $t_3$, and time $t_4$ may be any predefined time.

FIG. 4 is a diagram for describing a braking method according to the heart rate range and carelessness level of a driver according to an embodiment of the present disclosure.

Referring to FIG. 4, the controller 120 may issue a control command for braking the vehicle to the autonomous driving module 130 using information on the heart rate range of the driver and information on the driver's carelessness. The heart rate range of the driver can be divided into a normal range and an abnormal range. The normal range may be a range in which the driver's heart rate is 60 to 100 beats per minute. The abnormal range can be divided into a tachycardia range and a bradycardia range. The tachycardia range may be a range in which the driver's heart rate is greater than 100 beats per minute. The bradycardia range may be a range in which the driver's heart rate is less than 60 beats per minute. The carelessness level may be classified into four stages. Carelessness level 0 may correspond to a case in which the driver is concentrating on driving. Carelessness level 1 may correspond to a case in which the driver is talking, or the driver is careless for a short period of time. Carelessness level 2 may correspond to a case in which the driver is using a mobile device, or the driver is not looking ahead. Carelessness level 3 may correspond to a case in which the driver is drowsy, or the driver is not recognized.

If the carelessness level of the driver is level 0 and the heart rate range of the driver is the normal range, the controller 120 may not issue a control command for braking the vehicle to the autonomous driving module 130. If the carelessness level of the driver is level 0 and the heart rate range of the driver is the tachycardia range, the controller 120 may generate a warning sound without issuing a control command for braking the vehicle to the autonomous driving module 130 in the early stages of tachycardia. If tachycardia is maintained, the controller 120 may issue a control command for third-stage braking to the autonomous driving module 130. The controller 120 may additionally generate a warning sound when tachycardia is maintained. If the carelessness level of the driver is level 0 and the heart rate range of the driver is the bradycardia range, the controller 120 may issue a control command for third-stage braking to the autonomous driving module 130. The controller 120 may additionally generate a warning sound.

If the carelessness level of the driver is level 1 and the heart rate range of the driver is the normal range, the controller 120 may issue a control command for first-stage braking to the autonomous driving module 130. If the carelessness level of the driver is level 1 and the heart rate range of the driver is the tachycardia range, the controller 120 may issue a control command for first-stage braking to the autonomous driving module 130 in the early stages of tachycardia. If tachycardia is maintained, the controller 120 may issue a control command for third-stage braking to the autonomous driving module 130. The controller 120 may additionally generate a warning sound when tachycardia is maintained. If the carelessness level of the driver is level 1 and the heart rate range of the driver is the bradycardia range, the controller 120 may issue a control command for third-stage braking to the autonomous driving module 130. The controller 120 may additionally generate a warning sound.

If the carelessness level of the driver is level 2 and the heart rate range of the driver is the normal range, the controller 120 may issue a control command for second-stage braking to the autonomous driving module 130. If the carelessness level of the driver is level 2 and the heart rate range of the driver is the tachycardia range, the controller 120 may issue a control command for second-stage braking to the autonomous driving module 130 in the early stages of tachycardia. If tachycardia is maintained, the controller 120 may issue a control command for third-stage braking to the autonomous driving module 130. The controller 120 may additionally generate a warning sound when tachycardia is maintained. If the carelessness level of the driver is level 2 and the heart rate range of the driver is the bradycardia range, the controller 120 may issue a control command for third-stage braking to the autonomous driving module 130. The controller 120 may additionally generate a warning sound.

If the carelessness level of the driver is level 3 and the heart rate range of the driver is the normal range, the controller 120 may issue a control command for second-stage braking to the autonomous driving module 130. If the carelessness level of the driver is level 3 and the heart rate range of the driver is the tachycardia range, the controller 120 may issue a control command for second-stage braking to the autonomous driving module 130 in the early stages of tachycardia. If tachycardia is maintained, the controller 120 may issue a control command for third-stage braking to the autonomous driving module 130. The controller 120 may additionally generate a warning sound when tachycardia is maintained. If the carelessness level of the driver is level 3 and the heart rate range of the driver is the bradycardia range, the controller 120 may issue a control command for second-stage braking to the autonomous driving module 130 in the early stages of bradycardia. If bradycardia is maintained, the controller 120 may issue a control command for third-stage braking to the autonomous driving module 130. The controller 120 may additionally generate a warning sound if bradycardia is maintained.

Figure 5:
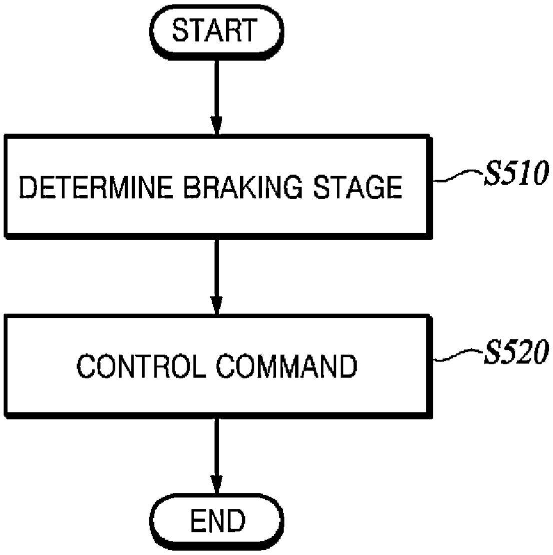
FIG. 5 is a flowchart for describing a process of controlling a vehicle using a driver's condition according to an embodiment of the present disclosure.

FIG. 5 is a flowchart for describing a process of controlling a vehicle using a driver's condition according to an embodiment of the present disclosure.

Referring to FIG. 5, the vehicle control apparatus determines a braking stage using information on a heart rate range and information on carelessness (S510). The vehicle control apparatus issues a control command for braking to the vehicle using the braking stage (S520). The vehicle control apparatus may issue a control command for braking to the autonomous driving module 130 mounted in the vehicle. The information on the heart rate range may be obtained by recognizing the driver's heart rate. The information on carelessness may be obtained by recognizing the driver's face and characteristics such as direction of gaze, the position of the head or face, and the like. Braking stages may be classified into first-stage braking, second-stage braking, and third-stage braking.

The information on the heart rate range may include information on whether the heart rate range of the driver is the normal range, information on whether the heart rate range of the driver is the tachycardia range, and information on whether the heart rate range of the driver is the bradycardia range. The information on carelessness may include information on carelessness level 0, information on carelessness level 1, information on carelessness level 2, and information on carelessness level 3.

The first-stage braking may be braking in which jerk braking is applied to the vehicle once and then a predetermined deceleration is applied to the vehicle. The second-stage braking may be braking in which jerk braking is applied to the vehicle two or more times and then a predetermined deceleration is applied to the vehicle. The third-stage braking may be braking in which a stepwise deceleration is applied to the vehicle or jerk braking is additionally applied to the vehicle in deceleration maintenance intervals of the stepwise deceleration. Jerk braking may be braking for increasing the amount of deceleration of the vehicle, maintaining a target amount of deceleration of the vehicle for a predetermined time, and reducing the amount of deceleration of the vehicle to zero (0). The process of issuing the control command for braking to the vehicle may include a process of generating a warning sound when the braking stage is determined to be third-stage braking.

Each element of the apparatus or method in accordance with the present disclosure may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a compact disc ROM (CD-ROM), magnetic tape, a floppy disk, a memory card, a hard disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely a description of the technical idea of embodiments of the present disclosure. In other words, those having ordinary skill in the art to which embodiments of the present disclosure belong may appreciate that various modifications and changes can be made without departing from essential features of an embodiment of the present disclosure. In other words, the sequence illustrated in the flowcharts/timing charts can be changed and one or more operations of the operations can be performed in parallel. Thus, flowcharts/timing charts are not limited to the temporal order.

Although embodiments of the present disclosure have been described for illustrative purposes, those having ordinary skill in the art may appreciate that various modifications, additions, and substitutions are possible, without departing from the idea and scope of the present disclosure. Therefore, embodiments of the present disclosure have been described for the sake of brevity and clarity. The scope of the technical idea of the present disclosure is not limited by the illustrations. Accordingly, one of ordinary skill would understand that the scope of the present disclosure is not to be limited by the above explicitly described embodiments but by the claims and equivalents thereof.

What is claimed is:

1. A method performed by a vehicle control apparatus, the method comprising:

determining a braking stage based on information on a heart rate range of a driver and information on a carelessness of the driver;

transmitting a control command for braking to a vehicle based on the braking stage; and controlling the vehicle based on the control command for braking, wherein the information on the heart rate range is obtained by recognizing a heart rate of the driver, wherein the information on the carelessness is obtained by recognizing a face of the driver, wherein the braking stage is classified into first-stage braking, second-stage braking, and third-stage braking, and wherein the first-stage braking is braking in which jerk braking is applied to the vehicle once and then a predetermined deceleration is applied to the vehicle, the second-stage braking is braking in which jerk braking is applied to the vehicle two or more times and then a predetermined deceleration is applied to the vehicle, and the third-stage braking is braking in which a stepwise deceleration is applied to the vehicle or jerk braking is additionally applied to the vehicle in deceleration maintenance intervals of the stepwise deceleration.

2. The method of claim 1, wherein the jerk braking is braking for increasing an amount of deceleration of the vehicle, maintaining a target amount of deceleration of the vehicle for a predetermined time, and reducing the amount of deceleration of the vehicle to zero.

3. The method of claim 1, wherein transmitting a control command for braking to the vehicle comprises:

generating a warning sound when the braking stage is determined to be the third-stage braking.

4. The method of claim 1, wherein the information on the heart rate range of the driver includes information on whether the heart rate range of the driver is a normal range, information on whether the heart rate range of the driver is a tachycardia range, and information on whether the heart rate range of the driver is a bradycardia range.

5. The method of claim 1, wherein the information on the carelessness of the driver includes information classified as carelessness level 0, information classified as carelessness level 1, information classified as carelessness level 2, and information classified as carelessness level 3.

6. A vehicle control apparatus comprising:

a memory; and a plurality of processors, wherein at least one processor of the plurality of processors is configured to determine a braking stage of a vehicle based on information on a heart rate range of a driver and information on carelessness of the driver;

transmit a control command for braking to the vehicle based on the braking stage; and control the vehicle based on the control command for braking, wherein the information on the heart rate range is obtained by recognizing a heart rate of the driver, wherein the information on the carelessness of the driver is obtained by recognizing a face of the driver, wherein the braking stage is classified into first-stage braking, second-stage braking, and third-stage braking, and wherein the first-stage braking is braking in which jerk braking is applied to the vehicle once and then a predetermined deceleration is applied to the vehicle, the second-stage braking is braking in which jerk braking is applied to the vehicle two or more times and then a predetermined deceleration is applied to the vehicle, and the third-stage braking is braking in which a stepwise deceleration is applied to the vehicle or jerk braking is additionally applied to the vehicle in deceleration maintenance intervals of the stepwise deceleration.

7. The vehicle control apparatus of claim 6, wherein the jerk braking is braking for increasing an amount of deceleration of the vehicle, maintaining a target amount of deceleration of the vehicle for a predetermined time, and reducing the amount of deceleration of the vehicle to zero.

8. The vehicle control apparatus of claim 6, wherein the at least one processor of the plurality of processors is configured to generate a warning sound when the braking stage is determined to be the third-stage braking.

9. The vehicle control apparatus of claim 6, wherein the information on the heart rate range of the driver includes information on whether the heart rate range of the driver is a normal range, information on whether the heart rate range of the driver is a tachycardia range, and information on whether the heart rate range of the driver is a bradycardia range.

10. The vehicle control apparatus of claim 6, wherein the information on the carelessness of the driver includes information classified as carelessness level 0, information classified as carelessness level 1, information classified as carelessness level 2, and information classified as carelessness level 3.

11. A non-transient computer-readable medium storing a computer program including computer-executable instructions for causing, when executed by a computer, the computer to perform steps of:

determining a braking stage of a vehicle based on information on a heart rate range of a driver and information on carelessness of the driver;

transmitting a control command for braking to the vehicle based on the braking stage; and controlling the vehicle based on the control command for braking, wherein the information on the heart rate range is obtained by recognizing a heart rate of the driver, wherein the information on carelessness of the driver is obtained by recognizing a face of the driver, wherein the braking stage is classified into first-stage braking, second-stage braking, and third-stage braking, and wherein the first-stage braking is braking in which jerk braking is applied to the vehicle once and then a predetermined deceleration is applied to the vehicle, the second-stage braking is braking in which jerk braking is applied to the vehicle two or more times and then a predetermined deceleration is applied to the vehicle, and the third-stage braking is braking in which a stepwise deceleration is applied to the vehicle or jerk braking is additionally applied to the vehicle in deceleration maintenance intervals of the stepwise deceleration.

* * * * *